(12) United States Patent
Tonkin

(10) Patent No.: US 6,885,294 B1
(45) Date of Patent: Apr. 26, 2005

(54) MOTOR VEHICLE DISPLAY APPARATUS

(75) Inventor: Mark Christopher Tonkin, Lewes (GB)

(73) Assignee: Design Technology & Innovation (Safety) 1994 Limited (GB)

( * ) Notice: Subject to any disclaimer, the term of this patent is extended or adjusted under 35 U.S.C. 154(b) by 0 days.

(21) Appl. No.: 09/509,402

(22) PCT Filed: Sep. 25, 1998

(86) PCT No.: PCT/GB98/02906
§ 371 (c)(1),
(2), (4) Date: Jun. 16, 2000

(87) PCT Pub. No.: WO99/16639
PCT Pub. Date: Apr. 8, 1999

(30) Foreign Application Priority Data

Sep. 26, 1997  (GB) ............................................. 9720389

(51) Int. Cl.[7] ................................................. B60Q 1/26
(52) U.S. Cl. ...................... 340/463; 340/467; 340/468; 340/479; 340/464
(58) Field of Search ............................... 340/463, 464, 340/467, 468, 479

(56) References Cited

U.S. PATENT DOCUMENTS

| | | | | |
|---|---|---|---|---|
| 4,631,515 A | * | 12/1986 | Blee et al. ................. 340/467 |
| 4,808,968 A | * | 2/1989 | Caine ......................... 340/479 |
| 4,924,207 A | * | 5/1990 | Larisey ....................... 340/467 |
| 4,928,084 A |   | 5/1990 | Reiser |
| 4,983,953 A | * | 1/1991 | Page .......................... 340/467 |
| 5,576,688 A |   | 11/1996 | Wu et al. |
| 5,682,137 A | * | 10/1997 | Li ............................... 340/467 |
| 5,717,377 A | * | 2/1998 | Gao ........................... 340/467 |
| 5,786,752 A | * | 7/1998 | Bucalo et al. .............. 340/467 |
| 6,175,305 B1 | * | 1/2001 | Johnson et al. ............ 340/479 |

FOREIGN PATENT DOCUMENTS

| | | |
|---|---|---|
| DE | 40 03 313 A | 8/1991 |
| DE | 196 05 813 A | 8/1996 |
| EP | 0554924 | 1/1993 |
| WO | WO 90 00991 A | 2/1990 |
| WO | WO 91 17068 A | 11/1991 |

* cited by examiner

Primary Examiner—Jeffery Hofsass
Assistant Examiner—Daniel Previl
(74) Attorney, Agent, or Firm—Needle & Rosenberg, P.C.

(57) ABSTRACT

An apparatus is disclosed for indicating the state of motion of a subject vehicle to a driver of a following vehicle, by means of an array of lamps (2, 10–21) on the subject vehicle. The apparatus is adapted to indicate the presence of the array of lamps on the subject vehicle when the lamps are not actively indicating the state of motion of the subject vehicle, with the presence of the array realized by, preferably, secondary warning lamps adjacently located with the array and arranged to differentiate the array in terms of its functionality and operational capabilities from existing arrays, as exemplified in FIG. 2.

36 Claims, 2 Drawing Sheets

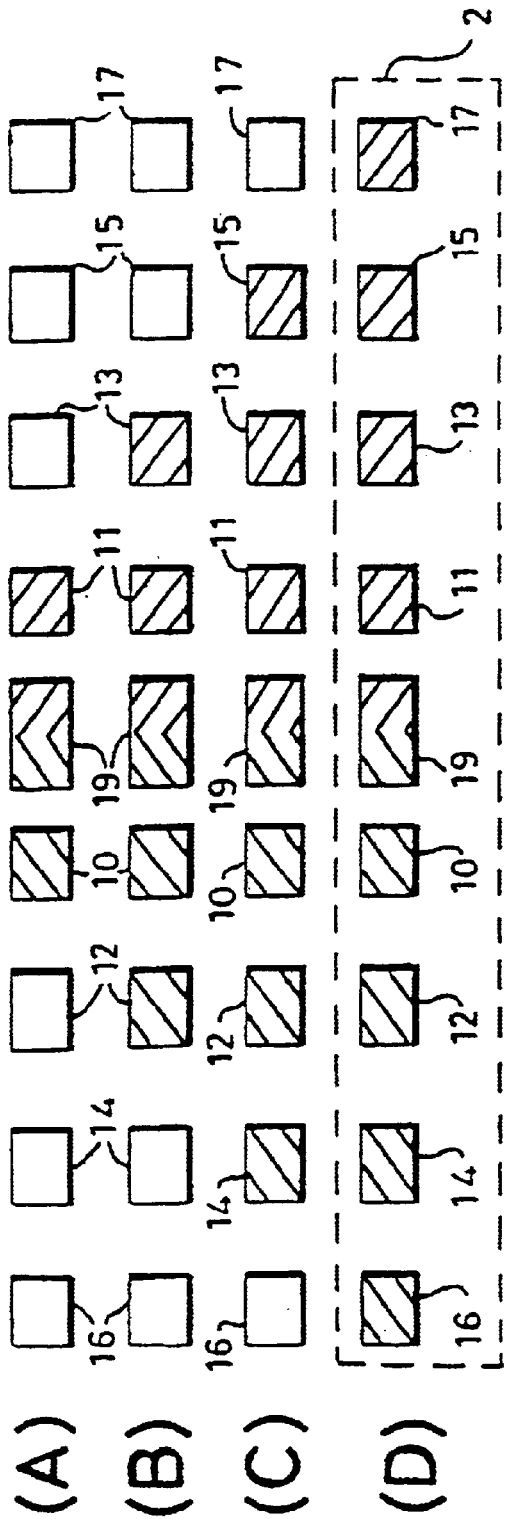
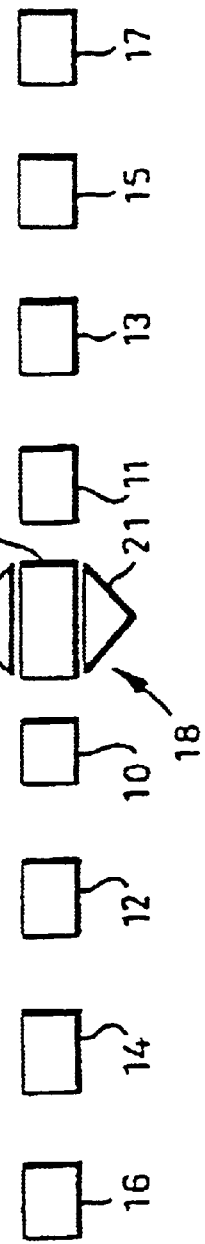

MOTOR VEHICLE DISPLAY APPARATUS

BACKGROUND TO THE INVENTION

This invention relates to an improved motor vehicle display apparatus and in particular to an apparatus with enhanced visibility.

The display apparatus in question is one in which an observer is provided with an indication of the magnitude of the deceleration of a subject motor vehicle, for example, from a following motor vehicle. The system also enables the observer to ascertain if the observed motor vehicle is stationary or moving.

SUMMARY OF THE PRIOR ART

Known display apparatus of this type comprises vehicle deceleration detection means and an indicator in which the vehicle deceleration detection means operatively communicates with the indicator to generate a predetermined signal independently of the braking system of the vehicle so that the indicator presents a visual display indicative of the magnitude of deceleration of the vehicle. Such an apparatus is disclosed in EP0680418. In this apparatus the indicator means comprises an array of lamps which are illuminated and extinguished in a time dependent, manner to indicate that the vehicle is stationary. The animate display may be a predetermined sequence of activating and deactivating the lamps or it may be random, if the sequence is predetermined, it may be cyclic. The stationary vehicle display may be deactivated after vehicle traction begins. The display remains observable while the vehicle engine is running and the vehicle is stationary until the second vehicle is detected as being a predetermined distance behind the first vehicle using a vehicle distance measuring device. This feature will avoid annoying following drivers in slow moving or stationary traffic.

Such a known system therefore addresses the problem of lack of indication of a degree of deceleration or lack of indication of a vehicle being stationary.

Thus a clear safety advantage should be provided by the apparatus, which should decrease the number of accidents due to a following vehicle colliding with a vehicle in front, as a result of the driver failing to realise that the subject vehicle is decelerating or is stationary. However, an unexpected safety issue arises should a driver of a following vehicle be involved in such an accident because of a belief that the car in front had such a system, and that the lack of illumination of the system was an indication of the motion of the vehicle, when in fact the vehicle in front did not have such a system. This is a particular issue in the early stage of the implementation of this system when not all vehicles will have the system.

PCT/GB93/00251 indicates a motor vehicle display system for indicating the state of motion of a subject vehicle and a method of indicating such a state through the selective illumination of an array.

EP-A-0 554 924 describes the inclusion of a signalling device that cooperates with a rear fog lamp and specifically that the signalling device causes the rear fog lamp to flicker when it energised and the motorcar is undergoing a braking condition.

U.S. Pat. No. 4,928,084 describes a vehicle brake light and display system in which an array of light emitting diodes can be selectively energised to display a message until such time as the brake is applied, whereafter the message capability is deactivated and the array fully energised.

U.S. Pat. No. 4,924,207 describes a rear window mounted deceleration warning lamp that is energised independently of the brake circuit and which glows yellow or amber in response to release of the accelerator pedal (and hence the closure of the throttle arm or carburettor). U.S. Pat. No. 5,576,668 is generally related to the area of signal light systems for vehicles and provides an indication of the state of motion of the vehicle.

In the prior art, it will be appreciated that the brake pedal can actually be depressed slightly thus illuminating the brake warning lamps before actual application of the brakes to the wheels occurs.

There is therefore a requirement to distinguish between vehicles which have and vehicles which do not have such display systems.

SUMMARY OF THE INVENTION

According to the present invention there is provided an apparatus for indicating the state of motion of a subject vehicle to a driver of a following vehicle by means of an array of lamps on the subject vehicle, wherein the apparatus is adapted to indicate the presence of the array of lamps on the subject vehicle when the lamps are not actively indicating the state of motion of the subject vehicle.

Preferably, the array of lamps includes a central high mounted stop lamp (CHMSL). Preferably the CHMSL is a non-standard shape and may for example include a first, triangular lamp located above a central standard rectangular lamp and a second triangular lamp located beneath the rectangular lamp.

Alternatively, the apparatus may include two or more CHMSLs.

One or more of the lamps may be illuminated at all times, when the vehicle engine is on, to a level less than full illumination utilised by the apparatus to indicate the state of motion of the subject vehicle. In this case a first voltage may be applied to one or more of the lamps substantially continuously, when the subject vehicle engine is on, said voltage being increased to indicate the state of motion of the subject vehicle.

Alternatively, one or more Light Emitting Diodes (LEDs) may be located substantially adjacent one or more of the lamps in said array, said LEDs indicating the presence of said array of lamps. The lamps may be triangular or rectangular and may have an LED located at one or more of their corners. The lamps or LEDs may be yellow or orange in order to distinguish them from the red CHMSL.

Additional or alternative means may also be utilised to indicate the presence of the array of lamps prior to their illumination to indicate the state of motion of the subject vehicle, for example, a neon lamp may be arranged to indicate the presence of the array of lamps.

In another aspect of the present invention there is provided an array of warning lamps arranged to indicate a state of motion of a subject vehicle to a driver of a following vehicle through selective illumination thereof to represent at least one of a degree of deceleration of the subject vehicle and a stationary state of the subject vehicle, the array of warning lamps characterised by: at least one warning lamp associated with the array to indicate the presence of the array on the subject vehicle, thereby to distinguish functional operation of the array of warning lamps.

In a preferred embodiment, the at least one warning lamp is one of: a centrally mounted stop lamp displaced from the array, and preferably displaced in a vertical plane to the array; at least one further warning lamp located adjacent to the array; and at least one lamp within the array that is actuated in timely association with a brake light switch actuated by a service brake pedal of the subject vehicle.

BRIEF DESCRIPTION OF THE DRAWINGS

An embodiment of the present invention will now be described, by way of example, with reference to the accompany drawings in which:

FIGS. 1A to 1D are schematic illustrations of a prior art display apparatus configured to indicate the state of motion of a subject vehicle;

FIG. 2 is a first embodiment of a vehicle display in accordance with the present invention;

DETAILED DESCRIPTION OF A PREFERRED EMBODIMENT

Figure 3:
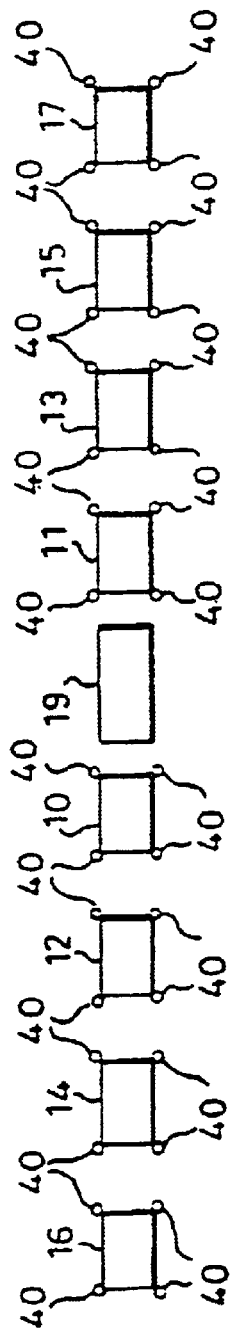
FIG. 3 illustrates a further embodiment of the present invention utilising LEDs.

Prior art motor vehicle display systems, such as that illustrated in FIGS. 1A to 1D, comprise an array 2 of eight lights 10 to 17 which normally would be displayed as red lights in a horizontal array located on opposite sides of a central high mounted stop light (CHMSL) 19. FIGS. 1A to 1D show a progressive increase in the number of lights which are illuminated dependent upon the magnitude of deceleration of the vehicle. The lights are represented as "on" in the drawings by light shading, compared to "off" which is indicated by a clear rectangle. FIG. 1A shows the most central lights 10 and 11 illuminated whilst FIG. 1D shows all eight lights 10 to 17 illuminated.

The display may comprise a different number of lamps. Whilst rectangular lights are shown here it is also possible to have lights of different shapes. The lights may be of different colours, though red or amber lights are preferred.

The array 2 of lights can be carried at the rear of a vehicle such as in the standard high level brake light position in the rear window of a motor car, for example. The lights face rearwardly and are located so that they are readily visible to an observer, e.g. the driver of a motor vehicle travelling or positioned behind the motor vehicle in which the lighting display is mounted. The lights 10 to 17 are lit in pairs from the centre pair 10 and 11 out to outer pair 16 and 17 during a progressive brake warning (PBW) display. As the vehicle slows the deceleration is indicated by the number of lights that are lit. Gentle deceleration causes the illumination of lights 10 and 11 whilst slightly increased deceleration (e.g. by harder braking or engine retardation caused either by gear changes or vehicle inclination as a consequence of passage up a slope or hill) causes lights 12 and 13 to be illuminated in addition to lights 10 and 11 as shown in FIG. 1B. Firm retardation of the vehicle caused for example by firm depression of a brake pedal is detected by the vehicle display system and causes further lights to be actuated. Thus lights 14 and 15 are illuminated in addition to lights 10 to 13 to indicate relatively large deceleration of the vehicle as shown in FIG. 1C. In order to show a more rapid reduction in vehicle velocity all eight lights are illuminated including the outer pair 16 and 17, as shown in FIG. 1D.

Other ways of indicating progressive deceleration might be to vary the relative sizes of pairs of lights, for example, increasing the size of lights 12 and 13 compared to inner pair 10 and 11 and so on, so that outer pair 16 and 17 are the largest. This is found to enhance the apparent "growth" effect of the display thereby emphasising the more rapid deceleration of the vehicle and its increasing proximity to trailing vehicles. Alternatively, each pair of lights might be a different colour, shade or intensity to other pairs of lights. For example, different tones of amber might be used starting from a light shade for inner pair 10 and 11 and darkening towards outer pair 16 and 17, or possibly outer pair 16 and 17 might be red. A further method would be to change the relative intensity of the pairs of lights to that outer pair 16 and 17 might be brighter than inner pair 10 and 11. A combination of these parameters might be used in a PBW display and also a vehicle stationary indicator in which the lights cycle on and off to indicate a stationary vehicle.

The lights themselves might comprise electroluminescent bulbs which radiate light through translucent, coloured filters. Alternatively, reflective lights might be used having phosphorescent targets: this can reduce the effect of dazzle of the display. Other forms of light source are envisaged such as LEDs, for example. The display may also comprise a control which enables the intensity of the overall display to be varied, for example, enabling adjustments from a bright day setting to a night setting.

The operation of the light sequence indicative of deceleration can be independent of the braking system of the vehicle and dependent principally on the absolute vehicle deceleration (subject to legislation), except that it is possible to illuminate the CHMSL 18 when the vehicle brake pedal is depressed independent of the actual deceleration caused. In this way the initial indication from the light display is similar to the known brake light displays.

It will be appreciated that legislation (in most major motoring territories) generally restricts the display of any retardation information to be tied to actuation of the service brake circuit, and therefore the array (of PCT/GB93/00251, for example) may be disabled until the brake lamp/light switch is actuated by the service brake pedal of a vehicle.

The apparatus for indicating the state of motion of a subject vehicle to a driver of a following vehicle by means of an array 2 of lamps 10–17 on a subject vehicle, in accordance with the present invention, is adapted to indicate the presence of the array of lamps on the subject vehicle when the lamps are not actively indicating the state of motion of the subject vehicle. Clearly, this or may not occur when the service brake pedal is not depressed. In other words, as one example, the presence of the enhanced functionality provided by the array may only be indicated (preferably) immediately after the CHMSL glows as a consequence of a slight depression of the service brake pedal (and possibly without actual brake engagement). Of course, the indication of functionality could occur before CHMSL illumination (and hence possibly without braking occurring).

FIG. 2 discloses an array of lamps 10–21 including a CHMSL 18 of a non-standard shape. In this first embodiment of the present invention the CHMSL includes the standard rectangular known CHMSL 19 plus a first triangular lamp 20 located above the central standard rectangular lamp 19 and a second triangular lamp 21 located beneath the rectangular lamp 19. An alternative to this arrangement, which is not illustrated, would be to locate the array of lamps including a first standard CHMSL 19 beneath or above a second standard CHMSL 19. Therefore, the vehicle would indicate the presence of the display apparatus because the vehicle would utilise two standard CHMSLs.

In another embodiment of the invention the apparatus is arranged such that whenever the CHMSL is illuminated the first pair of lamps (10, 11) are illuminated with the CHMSL or preferably shortly thereafter. Of course, an alternative lamp or pair of lamps in the array could be used for this identification function. A time lag (of approximately 1 second, for example) is envisaged between illumination of the CHMSL and illumination of the first pair of lamps (10, 11); although this time lag may be subject to the initial vehicle speed immediately before inception of the braking event. This allows a driver following or approaching the subject vehicle to see the CHMSL illuminate first and then subsequently to see the first set of lamps (10, 11) illuminate. Therefore, at all times when the CHMSL is in use the driver will be able to ascertain if a subject vehicle has or has not been fitted with the display apparatus. The additional benefits of the apparatus such as the sequential illumination of lamps to indicate vehicle velocity will be provided via the remaining pairs of lamps. In this embodiment the CHMSL may be a standard shape.

In a further embodiment a display system, as disclosed in FIG. 1 may be illuminated, partially, at all times when the vehicle is in operation but may only be fully illuminated when the brakes are actuated, as detailed above. In this case the partially illuminated lamps indicate the presence of the system on the vehicle.

FIG. 3 illustrates an alternate embodiment of the present invention wherein one or more LEDs 40 are located substantially adjacent one or more of the lamps in said array 2, said LEDs indicating the presence of said array 2 of lamps 10–17.

Figure 4:
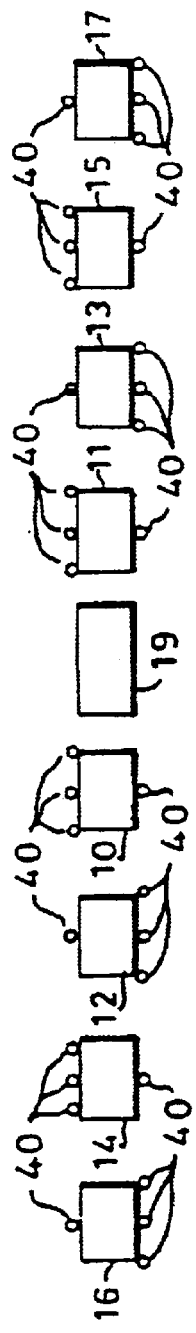
FIG. 4 also illustrates a further embodiment of the present invention also utilising LEDs.

FIG. 3 also illustrates the location of an LED 40 at the corner of each of the lamps 10–17. However, alternate lamp shape and alternate locations of the array 2 of LEDs may be utilised, such as that illustrated in FIG. 4, in order to indicate to the driver of a following vehicle that a subject vehicle comprises a display system in accordance with the present invention. Alternatively, LED's may be placed at the outer or inner corners of the lamps only, this requiring two instead of four LED's per lamp.

Figure 5:
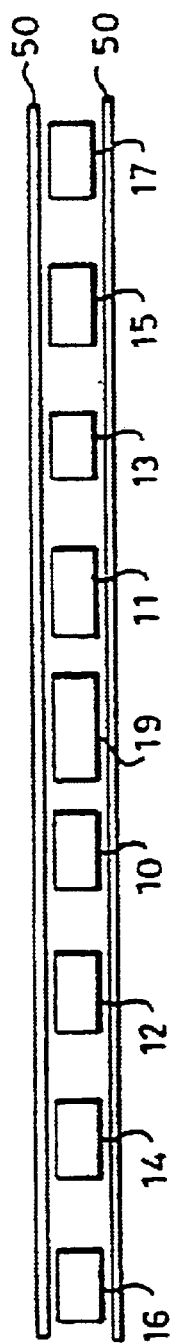
FIG. 5 illustrates an embodiment of the present invention utilising neon lamps.

FIG. 5 illustrates yet another embodiment of the present invention wherein neon lamps or tubes 50 are located adjacent the array of lamps 10–17 in order to indicate the presence of a display system in accordance with the present invention.

Figure 6:
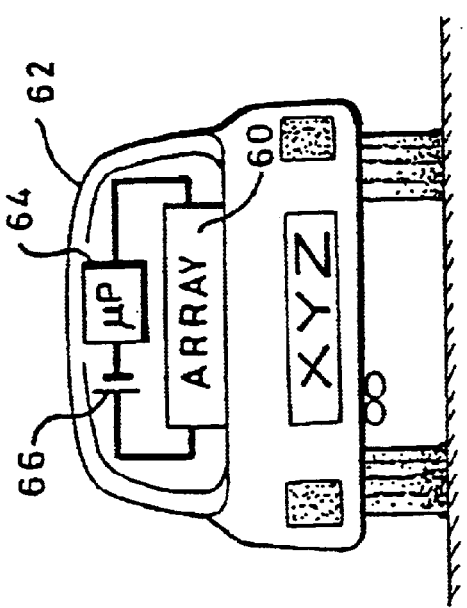
FIG. 6 shows the array of the preferred embodiment in situ within a vehicle.

FIG. 6 shows the array 60 of a preferred embodiment in situ within a vehicle 62, which array is generally controlled by a control circuit that is typically realised within a processor 64 arranged to control selective illumination of the array during retardation. Of course, since the secondary warning lamp scheme is independent from the braking system and acts to provide an indication of the enhanced functionality of the braking array, it may be that the secondary warning lamps are provided with a constant source 66 of energy for illumination purposes, although the preferred embodiment of the present invention also envisage that the differentiation can be realised by, for example, low level illumination of lamps immediately adjacent the CHMSL.

Modifications may be incorporated without departing from the scope of the present invention as claimed. For example, the lamps or LEDs may have a colour which is different to that of the lamp utilised in the CHMSL. One or more of the lamps or LEDs may be yellow or orange for example. In addition the disclosed indication means, such as the lamps themselves may be arranged to be illuminated at all times when the vehicle is in operation or may be arranged to be illuminated only at the instant that the vehicle brakes are initially actuated.

What is claimed is:

1. An apparatus for indicating the magnitude of deceleration of a subject vehicle to a driver of a following vehicle by means of an array of lamps on the subject vehicle, characterised in that the apparatus includes means adapted to indicate to the driver of a following vehicle, when the subject vehicle is in motion, the presence of the array of lamps on the subject vehicle when the lamps are not actively indicating the magnitude of deceleration of the subject vehicle.

2. The apparatus of claim 1, further including means arranged to indicate the presence of the lamps at the instant the vehicle brake is actuated.

3. The apparatus of claim 1, wherein the array of lamps includes a central high mounted stop lamp (CHMSL).

4. The apparatus of claim 3, wherein the CHMSL is a non-standard shape.

5. The apparatus of claim 4, wherein the CHMSL includes a first triangular lamp located above a central standard rectangular lamp and a second triangular lamp located beneath the rectangular lamp.

6. The apparatus of claim 3, wherein the apparatus includes and the array includes two or more CHMSLs.

7. The apparatus of claim 1, further comprising means for illuminating at least one lamp in the array when the vehicle engine is on, illumination of said one lamp being to a level less than full illumination utilized by the apparatus or the array to indicate the state of motion of the subject vehicle.

8. The apparatus of claim 7, further including means for generating a first voltage and means for applying said first voltage to at least one of the lamps when the subject vehicle engine is on, said voltage being increasable to indicate the state of motion of the subject vehicle.

9. The apparatus of claim 1, wherein at least one Light Emitting Diode (LEDs) is utilized to indicate the presence of said array of lamps.

10. The apparatus of claim 9, wherein said at least one LED is located substantially adjacent at least one of the lamps in said array, said LEDs indicating the presence of said array of lamps.

11. The apparatus of claim 10, wherein each of said lamps in said array has between three and four corners and includes an LED at each corner.

12. The apparatus as claimed in claim 1, wherein said lamps and said LEDs are one of yellow and orange.

13. The apparatus as claimed in claim 1, wherein a first pair of lamps from said array is illuminated, in addition to the CHMSL, on illumination of the CHMSL.

14. The apparatus as claimed in claim 13, wherein the first pair of lamps is illuminated shortly after the illumination of said CHMSL.

15. The apparatus of claim 14, wherein the first pair of lamps is illuminated approximately 1 second after the illumination of said CHMSL.

16. The apparatus of claim 13, wherein the pair of lamps (10, 11) are positioned adjacent the CHMSL.

17. An array of warning lamps arranged to indicate a magnitude of deceleration of a subject vehicle to a driver of a following vehicle through selective illumination thereof to represent the magnitude of deceleration of the subject vehicle and a stationary state of the subject vehicle, the array of warning lamps characterised by:

at least one warning lamp associated with the array to indicate to the driver of a following vehicle, when the subject vehicle is in motion, the presence of the array on the subject vehicle, thereby to distinguish functional operation of the array of warning lamps.

18. The array of claim 17, wherein the at least one warning lamp is one of: a centrally mounted stop lamp displaced from the array; at least one further warning lamp located adjacent to the array; and at least one lamp within the array that is actuated in timely association with a brake light switch actuated by a service brake pedal of the subject vehicle.

19. The array of claim 17 further including means arranged to indicate the presence of the lamps at the instant the vehicle brake is actuated.

20. The array of claim 17, wherein the array of lamps includes a central high mounted stop tamp (CHMSL).

21. The array of claim 20, wherein the CHMSL is a non-standard shape.

22. The array of claim 21, wherein the CHMSL includes a first triangular lamp located above a central standard rectangular lamp and a second triangular lamp located beneath the rectangular lamp.

23. The array of claim 20, wherein the array includes two or more CHMSLs.

24. The array of claim 17, further comprising means for illuminating at least one lamp in the array when the vehicle engine is on, illumination of said one lamp being to a level less than full illumination utilized by the array to indicate the state of motion of the subject vehicle.

25. The array of claim 24, further including means for generating a first voltage and means for applying said first voltage to at least one of the lamps when the subject vehicle engine is on, said voltage being increasable to indicate the state of motion of the subject vehicle.

26. The array of claim 17, wherein at least one Light Emitting Diode (LEDs) is utilized to indicate the presence of said array of lamps.

27. The array of claim 26, wherein said at least one LED is located substantially adjacent at least one of the lamps in said array, said LEDs indicating the presence of said array of lamps.

28. The array of claim 27, wherein each of said lamps in said array has between three and four corners and includes an LED at each corner.

29. The array of claim 17, wherein said lamps and said LEDs are one of yellow and orange.

30. The array of claim 17, wherein a first pair of lamps from said array is illuminated, in addition to the CHMSL, on illumination of the CHMSL.

31. The array of claim 30, further including means for illuminating the first pair of lamps shortly after the illumination of said CHMSL.

32. The array of claim 31, wherein the first pair of lamps is illuminated approximately 1 second after the illumination of said CHMSL.

33. The array of claim 30, wherein the pair of lamps (10, 11) are positioned adjacent the CHMSL.

34. The array of claim 17, wherein the centrally mounted stop lamp is displaced in a vertical plane to the array.

35. A vehicle comprising an array of warning lamps arranged to indicate a magnitude of deceleration of a subject vehicle to a driver of a following vehicle through selective illumination thereof to represent the magnitude of deceleration of the subject vehicle and a stationary state of the subject vehicle, the array of warning lamps characterised by:

at least one warning lamp associated with the array to indicate to the driver of a following vehicle, when the subject vehicle is in motion, the presence of the array on the subject vehicle, thereby to distinguish functional operation of the array of warning lamps.

36. A vehicle comprising apparatus for indicating the magnitude of deceleration of a subject vehicle to a driver of a following vehicle by means of an array of lamps on the subject vehicle, characterised in that the apparatus includes means adapted to indicate to the driver of a following vehicle, when the subject vehicle is in motion, the presence of the array of lamps on the subject vehicle when the lamps are not actively indicating the magnitude of deceleration of the subject vehicle.

* * * * *